J. BRONS.
HYDROCARBON ENGINE.
APPLICATION FILED APR. 13, 1907.
922,383.
Patented May 18, 1909.
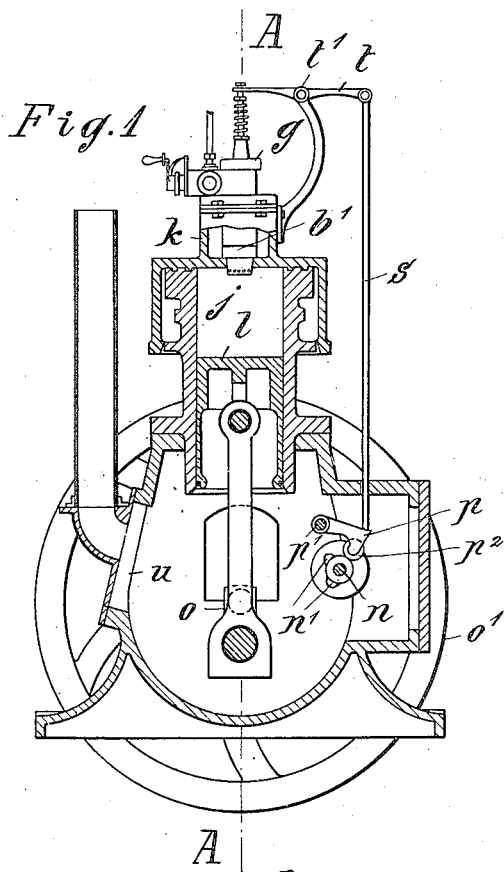
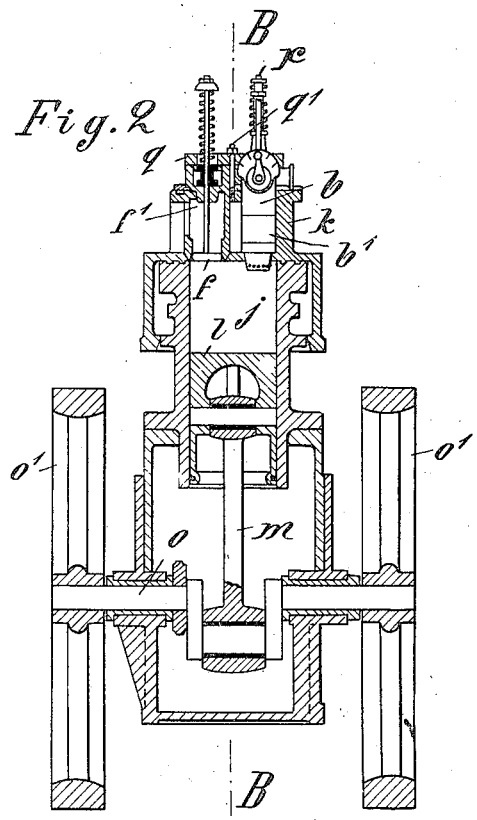
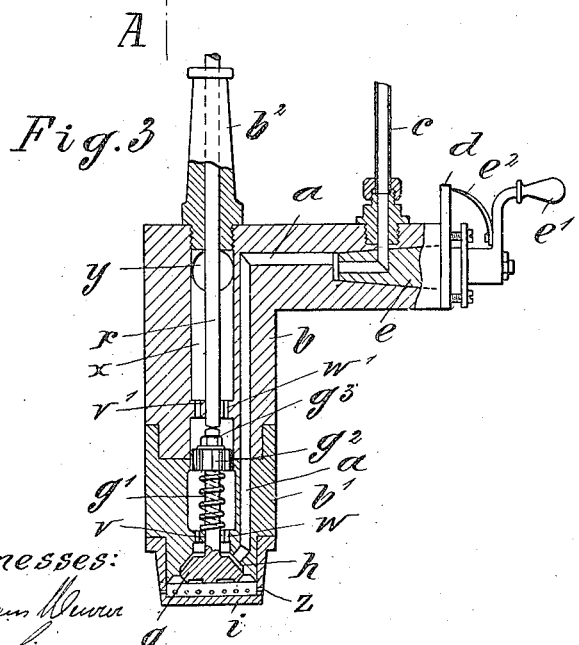
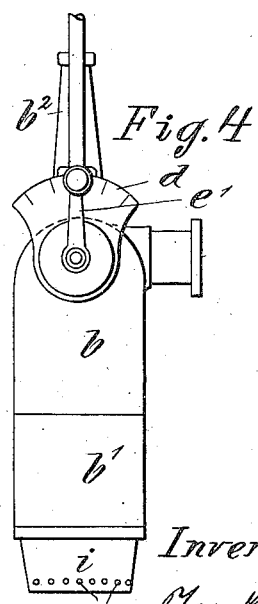
Witnesses:
Inventor:
Jan Brons

UNITED STATES PATENT OFFICE.

JAN BRONS, OF DELFZIJL, NETHERLANDS.

HYDROCARBON-ENGINE.

No. 922,383.      Specification of Letters Patent.      Patented May 18, 1909.

Application filed April 13, 1907. Serial No. 367,937.

*To all whom it may concern:*

Be it known that I, JAN BRONS, a subject of the Queen of the Netherlands, residing at Delfzijl, in the Kingdom of the Netherlands, have invented a new and useful Hydrocarbon-Engine, of which the following is a specification.

In the application for a U. S. patent for "hydrocarbon-engine" filed by me and Nanno Timmer on July 1, 1904, Serial No. 214,927 (*vide* also the German Patent Specification No. 167,149 and the British Patent Specification No. 14,165 of the year 1904) a four stroke cycle hydrocarbon-engine is described, in which air and liquid combustible are simultaneously admitted to the cylinder, but the mixture formed is utilized in two separate periods, partly by explosion and partly by combustion, under the direct influence of the working piston. In the said hydrocarbon-engine the air and the liquid combustible are separately admitted to the cylinder through special valves, the former through the ordinary air inlet-valve and the latter through another valve to the sprayer. Experience, however, has shown, that the separate admission of the air and the liquid combustible is not advantageous for the following reasons: As the perforations in the sprayer require to be small so as to render it possible to utilize the mixture in two separate periods and as the walls of the sprayer are necessarily heated during the preceding explosions and combustions of the mixture so that the liquid combustible in the sprayer is rapidly gasified, it follows that the air contained in the working cylinder during the compression stroke of the piston is not able to enter the sprayer in a sufficient quantity and to mix with the gas developed from the combustible in the sprayer. The consequence is, that the mixture so formed is hardly explosible, so that the force of the explosion taking place in the working cylinder in the proximity of the end of the compression stroke does not sufficiently penetrate into the sprayer for rapidly expelling therefrom by shocks the combustible through the perforations to the working cylinder.

My invention relates to an improvement in such four stroke cycle hydrocarbon-engines, whereby the said defect is avoided; and the improvement consists in an injecting device in which both the air and the liquid combustible are admitted to the sprayer through one and the same valve.

I will now proceed to describe my invention with reference to the accompanying drawings, in which—

Figure 1 is a vertical cross section through a four stroke cycle hydrocarbon-engine on the line B—B in Fig. 2, an upper part with the injecting device being shown in elevation, Fig. 2 is a vertical longitudinal section through the same on the line A—A in Fig. 1, the injecting device being shown in a side view. Fig. 3 is a vertical longitudinal section on an enlarged scale through the injecting device, and Fig. 4 is a side view of the same.

Similar letters of reference refer to similar parts throughout the several views.

In Figs. 1 and 2 I have shown a known four stroke cycle hydrocarbon-engine, but the construction of the same is quite immaterial. It is provided with an injecting device shown at Figs. 3 and 4. This device may comprise two bodies $b$ and $b^1$, a sprayer $i$ and a guide $b^2$, which are put together in the manner clearly shown. In the lower end of the body $b^1$ is formed a seat for a valve $g$, the spindle $g^1$ of which is guided at $v$ and is rigidly connected with a collar $g^2$ by means of a nut $g^3$. A helical spring inserted between the collar $g^2$ and the guide $v$ serves for pressing the spindle $g^1$ upward and thus closing the valve $g$. A space $h$ is provided in the body $b^1$ above the valve $g$ and communicates with the annular space beneath the guide $v$. This annular space in turn communicates through holes $w$ in the guide $v$ with the space between the latter and the collar $g^2$ above. The collar $g^2$ is on its periphery provided with several vertical cuts or recesses whereby the spaces above and beneath it are put in communication with one another. An upper spindle $r$ is guided in the guide $b^2$ and in the body $b$ at $v^1$ and bears on the spindle $g^1$ of the valve $g$. Above the guide $v^1$ the body is provided with a cylindrical chamber $x$, which communicates on the one hand with an air-inlet $v$ above and on the other hand through holes $w^1$ in the guide $v^1$ with the space below between the collar $g^2$ and the guide $v^1$. In both bodies $b$ and $b^1$ is provided a bent channel $a$, which terminates in the above mentioned space $h$. The upper horizontal branch of the body $b$ is formed as a cock, the plug $e$ of which has a bent channel that communicates with the channel $a$ and can register with a hole, in which a supply tube $c$ for liquid combustible is secured in any known manner. The stem of the plug $e$ is preferably provided with a handle $e^1$, on which an indicator $e^2$ for a scale $d$ is fastened. It will be understood, that by adjusting the handle $e^1$ in accordance with the scale $d$ the quantity of liquid combustible admitted from the supply tube $c$ to the channel $a$ can be varied. Of course the cock $e$ may be replaced by a valve or the like. The sprayer $i$ is of the kind described in the said patent specification, it being provided along its periphery with a series of small perforations $z$ at a certain small height above its bottom.

Both the injecting device just described and the casing $f^1$ of an outlet-valve $f$ are inserted in the cover $k$ of the motor and are there secured in any known and approved manner, for example by means of a holding down plate $q$ and a bolt $q^1$.

The crank-shaft $o$ is arranged to drive in any known manner a cam-shaft $n$ at such a rate, that the latter makes but one revolution on every two revolutions of the crank-shaft $o$ as usual. On the cam-shaft $n$ are fastened two suitable cams $n^1 n^1$ and placed at an angle to each other as usual. Above the cam-shaft $n$ an axle $p^1$ is disposed in the casing $u$, and two levers $p$ carrying rollers $p^2$ are mounted to rock on the axle $p^1$. Two vertical rods $s$ guided in suitable holes of the casing $u$ bear on the two levers $p$ and are pivotally connected with two two-armed levers $t$ rocking on an axle $t^1$. The other ends of the levers $t$ are arranged to act in any known manner upon the upper spindle $r$ of the injecting device and upon the spindle of the outlet-valve $f$ respectively. In Fig. 1 it is assumed that the two levers $p$ occupy the same position, so that only one of them is visible. The same is the case with the other parts $s$ and $t$.

The hydrocarbon-engine operates as follows: Suppose the engine is running, then the sprayer $i$ will be hot. During the suction stroke of the piston $l$ the valve $g$ will be opened from the respective cam $n^1$ by means of the corresponding parts $p^2, p, s, t, r$ and $g^1$, so that the downwardly moving piston $l$ will suck air into the cylinder $j$ through the air-inlet $y$, the chamber $x$, the holes $w^1$ in the guide $v^1$, the space between the guide $v^1$ and the collar $g^2$, the recesses in the collar $g^2$, the space between the collar $g^2$ and the guide $v$, the holes $w$ in the guide $v$, the spaces between the guide $v$ and the valve $g$, the sprayer $i$ and the perforations $z$ of the latter, and at the same time a small quantity of liquid combustible will be drawn in from the channel $a$ through the space $h$ into the sprayer $i$, which it may fill about up to the perforations $z$. The areas of the channel $a$ and of the cylindrical chamber $x$ are so proportioned and the plug $e$ is so adjusted by means of its handle $e^1$, that simultaneously with the air only a very small quantity of the liquid combustible is drawn through the opened valve $g$, so that most of the air passes freely through the small perforations $z$ into the cylinder $j$. Only a very small part of the liquid combustible will be gasified by the hot sprayer $i$ and the gas so formed mixes with the air sucked in, partly within the sprayer $i$ and partly in the cylinder $j$, so that the mixture filling the cylinder is very weak and therefore inexplosible. On the piston $l$ approaching its lowest position the slowly rising level of the liquid combustible within the sprayer $i$ will reach the perforations $z$, so that the air passing through the same will carry off the gas developed and particles of hot liquid combustible about to be gasified. Shortly before the end of the downward stroke of the piston $l$ the valve $g$ will be closed. On the piston $l$ reaching its lowest position it will be again moved upward by the live force of the two fly wheels $o^1 o^1$ with the aid of the crankshaft $o$ and the connecting rod $m$ to compress the contents. It is evident, that the upper part or stratification of the air in the proximity of the sprayer $i$ will be more strongly impregnated with gasified combustible than the lower part, so that an explosible mixture is formed only near the sprayer. In the proximity of the highest position of the piston $p$ the compressed explosible mixture will attain so high a temperature as to be capable of igniting itself, when a weak explosion and an increase of the temperature and the pressure will follow. After the passage of the crank-pin through the dead point the exploded mixture will drive the piston $l$ downward during the third stroke, while the combustible in the sprayer $i$ is forced out partly in its gasified state (due to the heat of the sprayer $i$ and the product) and partly in its liquid state either through the shock due to the explosion, or through the sucking effect of the pison $l$, since the latter in going downward increases the volume of the contents, so that the pressure in the sprayer $i$ varies, it either gradually or periodically exceeding that in the cylinder. The combustible thus injected into the cylinder $j$ gradually mixes with the hot air still left unburned in the cylinder and sustains the combustion, so that not only the mixture is prevented from cooling, but also the driving power is constantly supplemented and the piston $l$ is moved downward more uniformly than in ordinary explosion-engines.

During its fourth stroke the piston $l$ is forced upward by the live force of the two fly-wheels $o^1 o^1$ and the outlet-valve $f$ is opened to permit the burned gases to escape. Afterward all the occurrences described will repeat.

If the engine is not running, the sprayer $i$ may be cold and unable to gasify the liquid combustible to the channel in said casing, started as follows:

By turning the fly-wheels $o^1$ $o^1$ with one's hands or otherwise the valve $g$ is opened and so much liquid combustible is permitted to flow into the sprayer $i$, that a small quantity of it overflows through the perforations $z$ and drops on the piston $l$. The turning of the fly-wheels is continued, so that at the end of the compression stroke of the piston $l$ in the first cycle the small quantity of liquid combustible on the piston is gasified and may be ignited at once, or the gasified combustible will be ignited after a few cycles at the end of the compression stroke, so that the sprayer $i$ will become hot and be capable of gasifying the combustible, when the engine will be able to work.

Trials with the indicator have proved, that the hydrocarbon-engine provided with the new injecting device will yield from 10 to 15% more useful effect than one with the old injecting device disposed separately from the air-inlet valve.

The new injecting device may be varied in many respects without departing from the spirit of my invention.

I claim:

1. In a four stroke cycle hydrocarbon-engine, the combination with the cover of a cylinder provided with a space, of a spring-pressed valve in said cover beneath said space and adapted to downwardly open to the cylinder, means controlled from the engine for opening said spring-pressed valve during the first stroke of the piston, means for admitting air to said space, means for supplying liquid combustible to said space, means for adjusting the supply of the liquid combustible, and a box beneath and surrounding said spring-pressed valve and provided along its periphery with a plurality of perforations at a small height above its bottom and within the cylinder, said box being adapted by reason of its heat to partly gasify the liquid combustible and to mix the gas with the air more particularly toward the end of the first stroke and to serve as a sprayer during the third stroke of the piston.

2. In a four stroke cycle hydrocarbon-engine, the combination with the cover of a cylinder provided with a space, of a spring-pressed valve in said cover beneath said space and adapted to downwardly open to the cylinder, means controlled from the engine for opening said spring-pressed valve during the first stroke of the piston, said cover having an air-inlet and a chamber communicating therewith and with said space, means for supplying liquid combustible to said space, and a box beneath and surrounding said spring-pressed valve and provided along its periphery with a plurality of perforations at a small height above its bottom and within the cylinder, said box being adapted by reason of its heat to partly gasify the liquid combustible and to mix the gas with the air more particularly toward the end of the first stroke of the piston and to serve as a sprayer during the third piston stroke.

3. In a four stroke cycle hydrocarbon-engine, the combination with the cover of a cylinder provided with a space, of a spring-pressed valve in said cover beneath said space and adapted to downwardly open to the cylinder, means controlled from the engine for opening said spring-pressed valve during the first stroke of the piston, said cover having an air-inlet and a chamber communicating therewith and with said space, means for supplying liquid combustible to said space, means for adjusting the supply of the liquid combustible, and a box beneath and surrounding said spring-pressed valve and provided along its periphery with a plurality of perforations at a small height above its bottom and within the cylinder, said box being adapted by reason of its heat to partly gasify the liquid combustible and to mix the gas with the air more particularly toward the end of the first piston stroke and to serve as a sprayer during the third piston stroke.

4. In a four stroke cycle hydrocarbon-engine, the combination with a casing adapted to be inserted in the cover of a cylinder and provided with a space, a channel leading to said space, an air-inlet and a chamber communicating with said space and said air-inlet, of a spring-pressed valve in said casing beneath its space and adapted to downwardly open to the cylinder, means controlled from the engine for opening said spring-pressed valve during the first stroke of the piston, means for supplying liquid combustible to the channel in said casing, and a box at said casing beneath and surrounding said spring-pressed valve and provided along its periphery with a plurality of perforations at a small height above its bottom and within the cylinder, said box being adapted by reason of its heat to partly gasify the liquid combustible and to mix the gas with the air more particularly toward the end of the first stroke of the piston and to serve as a sprayer during the third piston stroke.

5. In a four stroke cycle hydrocarbon-engine, the combination with a casing adapted to be inserted in the cover of a cylinder and provided with a space, a channel leading to said space, an air-inlet and a chamber communicating with said space and said air-inlet, of a spring-pressed valve in said casing beneath its space and adapted to downwardly open to the cylinder, means controlled from the engine for opening said spring-pressed valve during the first stroke of the piston, means for supplying liquid combustible to the channel in said casing, means for adjusting the supply of the liquid combustible, and a box at said casing beneath and surrounding said spring-pressed valve and provided along its periphery with a plurality of perforations at a small height above its bottom and within the cylinder, said box being adapted by reason of its heat to partly gasify the liquid combustible and to mix the gas with the air more particularly toward the end of the first stroke of the piston and to serve as a sprayer during the third piston stroke.

In testimony whereof, I have signed my name to this application in the presence of two subscribing witnesses.

JAN BRONS.

Witnesses:
   WILLEM SOUTBERG,
   BERNARDUS ANNANIAS.